United States Patent [19]

Burnham

[11] Patent Number: 4,608,492

[45] Date of Patent: Aug. 26, 1986

[54] ULTRAVIOLET MONITOR SUNTAN ALARM WITH SELF TEST ROUTINES

[75] Inventor: Robert E. Burnham, Plymouth, Mich.

[73] Assignee: Teledyne Industries, Inc., Los Angeles, Calif.

[21] Appl. No.: 597,837

[22] Filed: Apr. 9, 1984

Related U.S. Application Data

[63] Continuation-in-part of Ser. No. 496,062, May 19, 1983, Pat. No. 4,535,244.

[51] Int. Cl.[4] ............................................. G01J 5/32
[52] U.S. Cl. ...................................... 250/372; 371/16
[58] Field of Search ..................... 250/372; 371/16, 25

[56] References Cited

U.S. PATENT DOCUMENTS

| | | | |
|---|---|---|---|
| 3,710,115 | 1/1973 | Jubb | 250/372 |
| 3,878,496 | 4/1975 | Erickson | 250/336.1 |
| 3,917,948 | 11/1975 | Strutz | 250/372 |
| 4,065,672 | 12/1977 | Harpster | 250/372 |
| 4,279,254 | 7/1981 | Boschetti et al. | 128/395 |
| 4,317,167 | 2/1982 | Hartig et al. | 364/185 |
| 4,428,050 | 1/1984 | Pellegrino et al. | 364/414 |
| 4,535,244 | 8/1985 | Burnham | 250/372 |

FOREIGN PATENT DOCUMENTS 102062 8/1980 Japan ..................... 371/16

*Primary Examiner*—Craig E. Church
*Assistant Examiner*—Constantine Hannaher
*Attorney, Agent, or Firm*—Gifford, Groh, VanOphem, Sheridan, Sprinkle & Dolgorukov

[57] ABSTRACT

The present invention provides a photodosimeter for use by sunbathers and the like and which activates an alarm when a predetermined radiation dosage has been received by the user. The photodosimeter includes a photocell mounted within the housing and exposed to sunlight through a housing opening. This photocell generates an analog output signal proportional to the radiation which impinges upon the photocell. An A/D converter converts the analog signal to a digital signal which is connected to a microprocessor which periodically samples the output from the converter and updates a cumulative radiation dosage counter in memory. When the cumulative radiation dosage exceeds a user settable maximum an alarm is activated. The microprocessor is further programmed to test a plurality of electrical conditions of the photodosimeter and to activate the alarm by a fail safe conduit in the event that one or more conditions are unsatisfied. Specifically, the microprocessor compares the determined radiation dosage to ensure that it falls between 0 and a predetermined maximum amount which are indicative of a nonfunctioning and overload conditions, respectively. The microprocessor further compares the read radiation dosage with the previous maximum amount and, if the current radiation dosage is less than a predetermined percentage, for example 25%, of the maximum amount, indicative that the photocell has been covered or obscured, activates the alarm. Still other electrical conditions of the photodosimeter are reiteratively checked by the microprocessor.

5 Claims, 3 Drawing Figures

ULTRAVIOLET MONITOR SUNTAN ALARM WITH SELF TEST ROUTINES

CROSS REFERENCE TO RELATED APPLICATIONS

This application is a continuation in part of U.S. Ser. No. 496,062, filed May 19, 1983, now U.S. Pat. No. 4,535,244 entitled PHOTODOSIMETER and naming Robert Burnham as inventor.

BACKGROUND OF THE INVENTION

I. Field of the Invention

The present Invention relates generally to dosimeters and, more specifically, to an ultraviolet dosimeter for use by sunbathers.

II. Description of the Prior Art

There are a number of previously known dosimeters which measure the cumulative exposure of the sensor to radiation, such as light. A number of these previously known dosimeters also include optical filters which limit the measured radiation to a predefined range, such as ultraviolet light, and a number of these dosimeters are designed for use by sunbathers in order to prevent sunburn. Examples of these previously known devices can be found in U.S. Pat. Nos. 3,710,115 to Jubb and 3,917,948 to Strutz.

A primary disadvantage of these previously known devices, however, is that they do not include any means for determining whether the internal components of the dosimeter are functioning correctly. For example, the light sensor, typically a photocell, may accidentally be obscured by a blanket or an article and thus detect a very low radiation when, in fact, the sunbather is exposed to a much higher radiation dosage. Likewise, the electrical circuitry of the photodosimeter may malfunction in other respects and subject the sunbather to a higher than desired radiation dosage.

SUMMARY OF THE PRESENT INVENTION

The present invention provides a photodosimeter which overcomes the above mentioned disadvantages of the previously known devices.

In brief, the photodosimeter of the present invention comprises a housing having an opening and containing an electrical circuit. A photocell is mounted beneath the opening which generates an output signal having a magnitude proportional to the intensity of ultraviolet radiation entering the housing opening. Preferably, an optical filter is positioned within the housing opening so that the photocell generates an output signal only during the presence of ultraviolet radiation.

The electrical circuit is preferably microprocessor based and repeatedly reads the output signal from the photocell via an A/D convertor. The microprocessor maintains a cumulative total of the ultraviolet radiation in a memory location and, when the total radiation exceeds a preset amount, activates the alarm to warn the sunbather.

In addition to reading and accumulating the ultraviolet radiation dosage, the microprocessor is also programmed to perform a series of tests on the electrical circuit in order to prevent an excessive radiation dose for the sunbather. In one such test, a microprocessor first reads the value of the output signal from the photocell and compares this value with the maximum output signal expected from the photocell. In the event that the read value equals or exceeds the maximum output value, the microprocessor activates the alarm to warn the sunbather that the radiation dose received is actually greater than that which can be measured by the photodosimeter.

The microprocessor next compares the output from the photocell with a zero value indicative that the photocell and/or its associated components are nonfunctioning. If the output from the photocell is zero, the microprocessor immediately activates the alarm to warn the sunbather of the malfunction.

The microprocessor then compares the output signal from the photocell with a predetermined percentage range that would be indicative that the photocell housing opening has been obscured, partially covered or otherwise shaded. In such an event, the sunbather may be receiving a greater radiation dosage than detected by the photodosimeter and, consequently, the microprocessor again activates the alarm.

In the event that the electrical circuitry of the dosimeter is functioning properly, the microprocessor periodically and momentarily activates the alarm in order to assure the user that the dosimeter is functioning properly. Thus, for example, in the event of a complete battery or power failure, the absence of the periodic and momentary activation of the alarm would advise the user that the dosimeter is not functioning.

The present invention further provides a fail safe alarm system which is deactivated only upon the receipt of the pulse train. This pulse train is generated by the microprocessor only when the electrical circuitry of the dosimeter is functioning properly. Conversely, the absence of the pulse train, which would occur during a malfunction of the circuit, activates the alarm.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PREFERRED EMBODIMENT OF THE INVENTION

Figure 1:
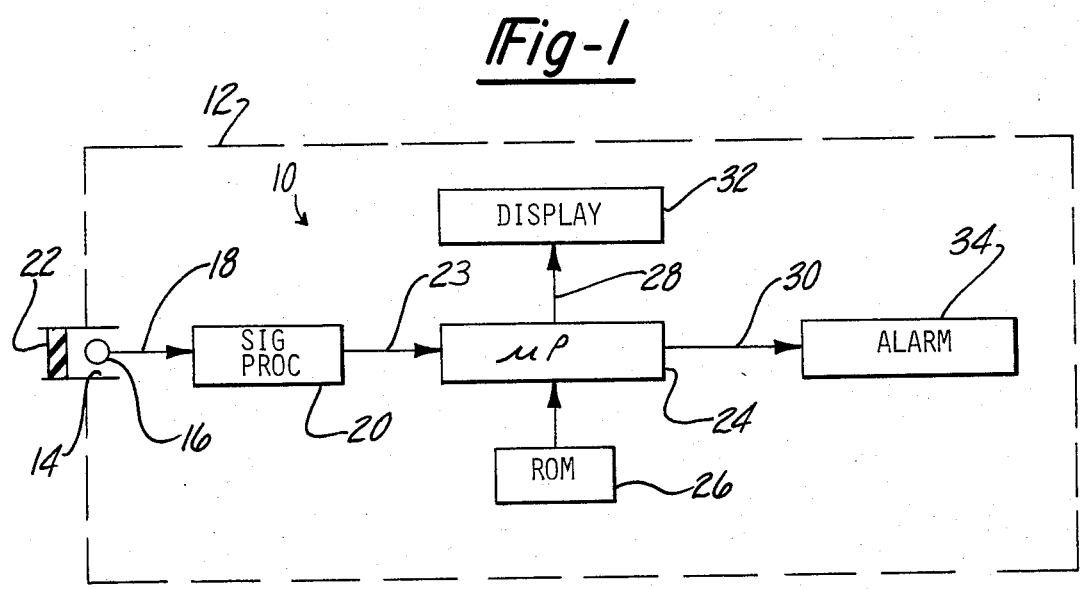
FIG. 1 is a block diagrammatic view illustrating a preferred embodiment of the present invention.

With reference first to FIG. 1, a block diagrammatic view of the preferred embodiment of the present invention is there shown and comprises an electronic circuit 10 which is contained within a housing 12 having an opening 14. A photocell 16 is mounted in alignment with the housing opening 14 and generates an analog signal on its output 18 to a signal processor 20. In addition, an optical filter 22 is preferably positioned within the housing opening 14 above the photocell 16 so that the photocell 16 generates an analog signal on its output 18 representative of the magnitude of ultraviolet radiation.

The signal processor 20 can be of any conventional construction, but preferably comprises an analog to digital (A/D) converter as well as a signal conditioner. The signal processor 20 in turn generates a signal on its output 23 to the data input of a microprocessor 24. A computer program is stored in a read only memory (ROM) 26 which controls the operation of the microprocessor 24. The ROM 26 may be either external to the microprocessor 24, as illustrated in the drawing, or self contained on the microprocessor 24.

The microprocessor 24 includes output lines 28 and 30 which respectively control a display 32 and an alarm 34. Preferably the display 32 is an LCD display while the alarm 34 is an audio beeper.

As is more fully described in my aforementioned copending application, the microprocessor 24 periodically samples the output from the photocell 16 and maintains a cumulative total of the radiation dosage detected by the photocell 16 in random access memory. When this cumulative radiation dosage exceeds a preset amount, the microprocessor 24 activates the alarm 34 to warn the sunbather to avoid the sun in order to prevent sunburn.

Figure 3:
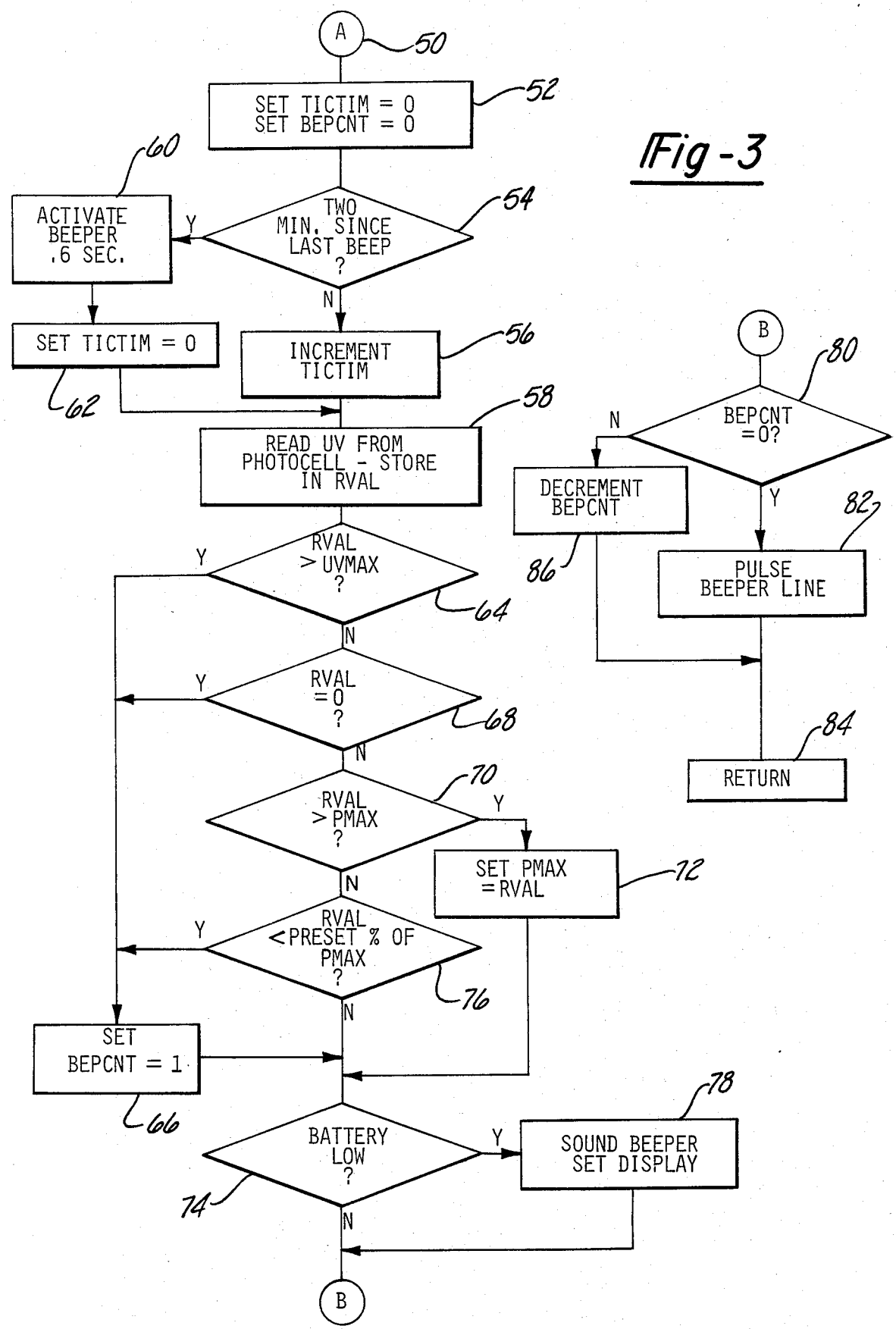
FIG. 3 is a flow chart illustrating the operation of the preferred embodiment of the invention.

With reference now to FIG. 3, in between each sampling of photocell 16, the microprocessor 24 executes an internal self-checking routine to ensure the proper operation of the electronic circuit 10. This self checking routine begins at entry point 50 and at step 52 immediately sets two variables, TICTIM and BEPCNT to 0. As is described more fully below, the TICTIM variable is employed as a two minute counting register while the BEPCNT variable is used as a flag register for an error condition in the electronic circuit 10.

As step 54 the value of TICTIM is compared with a value equal to two minutes. If unequal, TICTIM is incremented at step 56 and then proceeds to step 58. Conversely, if TICTIM is equal to or greater than two minutes, step 54 instead branches to step 60 which activates the alarm 34 for a short period of time, for example 0.6 seconds, to advise the user that the electronic circuit is operating. Step 62 then resets TICTIM, to zero and proceeds to step 58.

At step 58, the microprocessor reads the value from the photocell 16 indicative of the current radiation dosage and stores this value in variable RVAL. Step 58 then proceeds to step 64 where variable RVAL is compared to a variable UVMAX. The variable UVMAX represents the maximum radiation dosage that the electronic circuit 10 is capable of accurately measuring. Consequently, in the event that RVAL is greater than UVMAX, an error condition of electronic circuit has occurred whereupon step 64 branches to step 66 and sets BEPCNT to 1.

In the event that RVAL is less than UVMAX, step 64 branches to step 68 and tests for a zero value of RVAL. A zero value for RVAL is also indicative of an error in condition, i.e. a zero reading from the photocell 16. In this event, step 68 branches to step 66 and sets BEPCNT equal to 1.

Assuming that RVAL is between zero and UVMAX, step 68 branches to step 70 and compares RVAL with PMAX. The value of PMAX is equal to the maximum value of RVAL during current operating session of the device. If RVAL is greater than PMAX, indicative that the radiation dosage has increased, step 70 branches to step 72 and sets PMAX to the value of RVAL. Step 72 then branches to step 74.

Assuming that RVAL is equal to or less than PMAX, step 70 instead branches to step 76 which compares RVAL to a predetermined percentage of PMAX. This predetermined percentage is in the range of 10-35 percent and is preferably 25%. A value of RVAL less than this predetermined percentage of PMAX is indicative that the photocell 16 has been covered or otherwise obscured, i.e. a shade condition. In this event, the sunbather may be receiving a greater radiation dosage than is read by the photocell 16 and, consequently, branches to step 66 and sets BEPCNT to 1. If not, step 76 branches to step 74.

At step 74, the condition or voltage of the battery is checked by the microprocessor. If the battery is low, step 74 branches to step 78 and both sounds the alarm 34 and sets the display 32 (FIG. 1) to indicate a low battery condition. If the battery condition is within acceptable limits, step 74 branches to step 80 where the condition of BEPCNT is tested. If BEPCNT equals zero indicative that the electronic circuit 10 is operating as desired, step 80 branches to step 82 wherein the microprocessor generates a pulse on output line 30 (FIG. 1) to the alarm 34 and then returns to the calling program via step 84. On the other hand, if BEPCNT is unequal to 0, indicative of an error condition, step 80 instead branches to step 86 where BEPCNT is decremented and then returns to the calling program through step 84. Consequently, in the event of an error condition, the microprocessor does not execute step 82 and thus does not generate a pulse on the output line 30 to the alarm 34.

Figure 2:
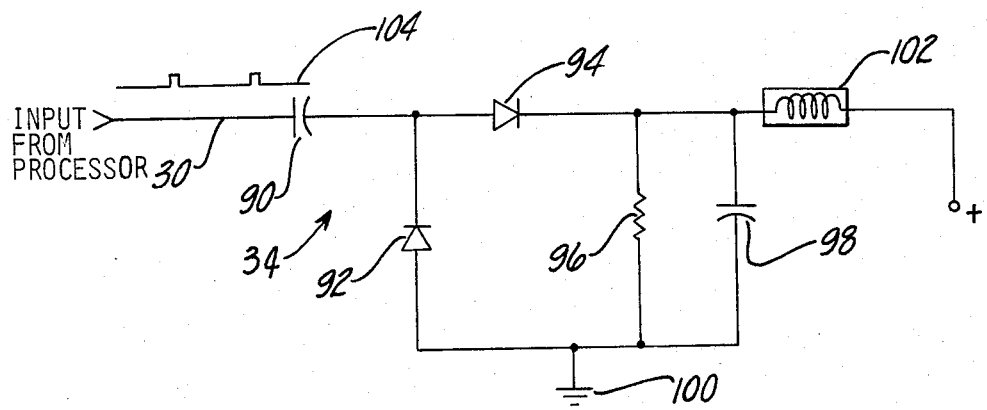
FIG. 2 is a schematic view illustrating a portion of the preferred embodiment of the invention.

With reference now to FIG. 2, the alarm 34 is there shown in greater detail in which the microprocessor output line 30 is coupled through a DC blocking capacitor 90 to one side of both a ground clamp diode 92 and a rectifier 94. The output from the rectifier 94 is connected to one side of both a bleed resistor 96 and a capacitor 98. The other sides of both the capacitor 98, bleed resistor 96 and ground clamp 92 are coupled to ground 100. The output from the rectifier 94 is also connected to an audio-beeper 102 having one side tied to a positive voltage.

During normal operation of the microprocessor and assuming that the electronic circuit 10 is operating properly, step 82 generates a pulse train 104 on the microprocessor output line 30. The pulse train passes through the rectifier 94 and reiteratively charges the capacitor 98 and, in doing so, deactivates the beeper 102. Between each pulse of the pulse train 104, the bleed resistor 96 drains the voltage from the capacitor 98 toward ground but before the voltage from the capacitor 98 reaches zero the next pulse on the pulse train 104 again charges the capacitor 98 and maintains the deactivation of the beeper 102.

On the other hand, in the event of an error condition, step 82 is not executed so that the pulse train 104 is not generated on the microprocessor output line 30. In this event, the bleed resistor 96 bleeds the voltage from the capacitor 98 and activates the beeper 102.

Therefore, it can be seen that the alarm 34 provides a fail safe system which requires a constant pulse train 104 in order to deactivate the beeper 102. Consequently, in the event of a malfunction of the electrical circuitry, in addition to any one of the several conditions tested by the microprocessor, the pulse train 104 will not be generated on line 30 so that the beeper 102 will be activated.

The only failure of the electronic circuitry which would also deactivate the beeper 102 would constitute a complete power failure to the system. In this event, however, step 60 (FIG. 3) will not be executed by the program and the continued silence from the beeper serves to alert the sunbather that the unit is not functioning.

Having described my invention, however, many modifications thereto will become apparent to those skilled in the art to which it pertains without deviation from the spirit of the invention as defined by the scope of the appended claims.

I claim:

1. A photodosimeter comprising:

a housing having an opening, electrical circuit means comprising means mounted beneath said opening for generating an output signal having a magnitude proportional to the intensity of ultraviolet radiation entering said housing opening, means for repeatedly reading said output signals and for storing a cumulative value of said output signals, means for determining and storing the maximum read value of said output signal, an alarm, means for activating said alarm when said cumulative value exceeds a preset value, means for comparing a currently read output signal with the previously stored maximum read value of said output signal, and means responsive to said comparing means for activating said alarm when said output signal is between ten and thirty five percent of the previously determined maximum read value of said output signal from said generating means.

2. The invention as defined in claim 1 and comprising means for activating said alarm when the output signal from said generating means is zero.

3. The invention as defined in claim 1 and comprising means for activating said alarm when the output signal from said generating means exceeds a predetermined maximum value.

4. The invention as defined in claim 1 and comprising means for repeatedly testing a plurality of conditions of said electrical circuit means and for generating a test signal representative thereof, and means for activating said alarm when said test signal is a first value, said first value being indicative of an error condition in said electrical circuit means.

5. The invention as defined in claim 4 wherein said testing means comprises means for generating a pulse train when said test signal is a second value indicative of a no-error condition in said electrical circuit means, and means responsive to said pulse train for deactivating said alarm.

* * * * *